United States Patent Office 2,962,499
Patented Nov. 29, 1960

2,962,499

CERTAIN ESTERS OF TROPINE AND TROPINIUM SALTS

Nathan Weiner, Rego Park, and Samuel M. Gordon, Forest Hills, N.Y., assignors to Endo Laboratories, Inc., Richmond Hill, N.Y., a corporation of New York No Drawing. Filed July 3, 1957, Ser. No. 669,707

8 Claims. (Cl. 260—292)

This invention relates to tropine; and in particular is directed to new esters of tropine and quarternary tropinium salts thereof, which are characterized by a surprising and remarkable stability to hydrolysis and unexpected pharmacological activity; and method of preparing them.

The naturally occurring alkaloid atropine is the tropic acid ester of tropine of Structure I.

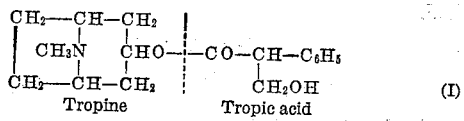

Atropine has the ability to block, diminish or reverse the various physiologic actions of acetyl choline. There have been synthesized many compounds with activities similar to those of atropine in some respect or other. In general, such compounds have been esters of amino alcohols. For example, a large series of esters of tropine have been synthesized in which simple normal aliphatic acids, hydroxy aliphatic acids, aromatic acids, and hydroxy aromatic acids have been used for the acid moiety.

These esters of tropine are in general characterized by a relative ease of hydrolysis into the acid and tropine fragments, whereby the atropine-like action is lost. This is of great practical significance for application of these compounds. A common means of administering these compounds is as an elixir or syrup. When so compounded, careful attention must be paid to the control of the pH of the solvent medium in order to minimize the hydrolysis. Frequently the pH for optimum stability may be incompatible with the stability or even the presence of other pharmacological agents in the preparation. Thus, it would become impossible to administer, in a syrup or elixir, a desirable combination of two synergistic pharmacologic agents in which such incompatibilities might arise. Even at the optimum pH for stability, hydrolysis will take place slowly.

The esters of our invention are made from branched chain aliphatic acids of the following general structure—

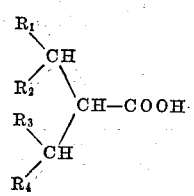

in which $R_1$ and $R_3$ are alkyl groups containing 1 to 4 carbon atoms and $R_2$ and $R_4$ are drawn from the groups embracing hydrogen and alkyl groups containing 1 to 4 carbon atoms. The tropinium salts of this invention thus have the structure—

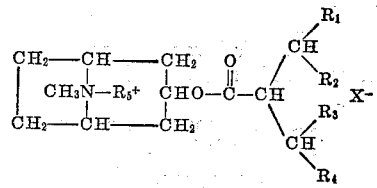

wherein $R_1$, $R_2$, $R_3$ and $R_4$ have the value previously defined above; $R_5$ is chosen from the group of hydrogen, lower alkyl and lower aralkyl, e.g. benzyl, substituted benzyl, phenethyl and substituted phenethyl, and $X^-$ is the anion of any suitable, physiologically compatible acid. Thus the compounds of this invention are in the form of salts of the tertiary tropine ester base or the derived quarternary ammonium salts, where $R_5$ has values other than hydrogen. Examples of the salts which can be prepared from these esters include halide, sulfate, phosphate, citrate, tartrate, nitrate, methosulfate and the like.

Some of the processes by which the compounds of our inventions are given in the examples which follow; and many of the compounds encompassed by this invention are listed by number in Table I.

To demonstrate the unusual stability to hydrolysis of the novel esters, we have compared the rate of hydrolysis of homatropine methyl bromide of the following structure

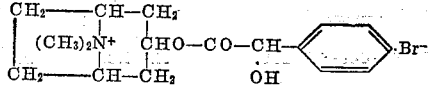

with the rate of hydrolysis of a selected group of the compounds of our invention.

Thus, homatropine methyl bromide in a concentration of 0.0025 molar is hydrolyzed at room temperature by 0.005 molar sodium hydroxide at a rate such that 50% of the ester has disappeared in 2.2 minutes. Thus, the half life thereof under those conditions is 2.2 minutes. When compound No. 7 of Table I is subjected to hydrolysis under the same conditions of concentration and temperature, the rate of disappearance of the ester is too slow to be conveniently measured. When the concentrations are increased to 0.025 molar in ester and 0.05 molar in sodium hydroxide the rate is such that 50% of the ester disappeared in 32.6 hours. It should be noted that this rate is achieved with a concentration of reactants that in the case of homatropine methyl bromide would speed up the hydrolysis ten-fold and bring about a half-life of 13.2 seconds. Thus the rate of hydrolysis of compound No. 7 is 8400-fold slower than that of homatropine methyl bromide. Even at 37° C. the rate of hydrolysis of compound No. 7, at a concentration of 0.025 molar and 0.05 molar sodium hydroxide is such that 50% hydrolysis occurs in about 10 hours, or 2700-fold slower than homatropine methyl bromide at room temperature.

When other compounds, such as Nos. 13, 17, 21, 25 and 28 were similarly tested for stability to hydrolysis under the conditions used for the testing of No. 7, it was found that all of these hydrolyze within the same approximate range of rates as No. 7, but many-fold more slowly than homatropine methyl bromide.

As noted above, many different types of acids have previously been used in preparing esters of tropine. Among all these, no esters of the aliphatic acids or hydroxy aliphatic acids with tropine were found to have any atropine-like action. In contrast, tropine esters of many aromatic and hydroxy aromatic acids have been found to have activities similar to those of atropine, although, generally, not so potent. This generalization is recognized by those skilled in the art of such compounds (see, e.g., "Introduction to Chemical Pharmacology" by R. B. Barlow, John Wiley & Sons, Inc., New York, 1956). In this text, on page 136, appears Table 36 in which are given the mydriatic activity of such esters of tropine.

It was therefore to be expected that tropine esters of all aliphatic monobasic acids would be lacking in atropine-like action. Contrary to this expectation, we found that tropine esters of this invention possess marked atropine-like activity, and in certain instances are several times as potent.

Examples of the new compounds and the methods of their preparation are as follows:

EXAMPLE 1

*Diethyl acetyl tropinium citrate*

To a solution of 17.25 gms. (0.128 mole) of tropine in 100 ml. of anhydrous pyridine was added 19.6 gms. (0.145 mole) of diethylacetyl chloride. The mixture was boiled under reflux for 6 hours. It was then cooled, and the pyridine removed in a vacuum of 50—75 mm. with gentle heating. The solid residue was dissolved in chloroform. The chloroform solution was extracted with 10% hydrochloric acid. The aqueous acid solution was made basic, and the basic ester product was extracted with ether. The ether solution was dried and evaporated to dryness, leaving the product ester. This was treated with an equimolar quantity of citric acid, dissolved in ethanol. The citrate, of the composition shown, crystallized almost immediately.

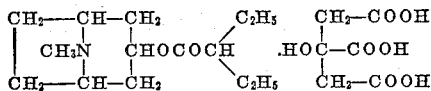

This was recrystallized from ethanol and melted at 155° C.

EXAMPLE 2

*Diethyl acetyl tropinium metho-bromide*

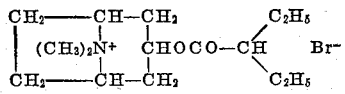

A solution of 2.62 (0.011 mole) of diethyl acetyl tropine was made in 50 cc. of acetone. This free base was taken either from the appropriate stage of Example 1 or by liberation of the free base from the citrate salt of Example 1 with ammonia, extraction into ether, drying and evaporation of the ether extract to dryness. To the acetone solution of the free base was added an acetone solution, containing an excess of methyl bromide. Within a few minutes the methobromide started to crystallize. The mixture was allowed to stand for several hours. The crystallized solid was filtered, and additional product was obtained by evaporation of the filtrate. The yield was nearly quantitative. After recrystallization from acetone, the product melted at 318° C.

*Analysis.*—Calcd. for $C_{15}H_{28}NO_2Br$: Br, 23.90. Found: Br, 23.70.

EXAMPLE 3

*Diethyl acetyl tropinium butobromide*

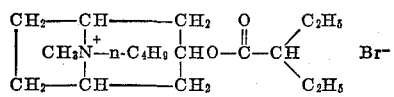

A solution of 4.13 gms. (.0124 mole) of diethyl acetyl tropine in acetone was prepared as in Example 2. This solution was boiled under reflux with 5 ml. of n-butyl bromide. On cooling the product crystallized. It was recrystallized from acetone and melted at 232° C.

*Analysis.*—Calcd. for $C_{18}H_{34}NO_2Br$: Br, 21.2%. Found: Br, 21.02%.

EXAMPLE 4

*Di-n-propyl acetyl tropine hydrochloride*

Tropine (11.12 gms.) was dissolved in 100 ml. of anhydrous pyridine and to this solution was added 15.64 gms. of di-n-propyl acetyl chloride. The mixture was refluxed for 6 hours. This solution was then cooled and the pyridine removed in vacuo. The residue was dissolved in chloroform. The chloroform solution was washed with 10% hydrochloric acid to remove the residual trace of pyridine. The hydrochloride of the product ester is soluble in chloroform and is not extracted from chloroform by hydrochloride acid. This is an unexpected property. This unusual physical property is, in addition to the pharmacological action, a distinctive characteristic of most of the compounds of this invention.

The chloroform solution of the hydrochloride was dried over anhydrous calcium sulfate, and evaporated to dryness, leaving a semi-solid residue of product ester hydrochloride. This was recrystallized from chloroform-hexane mixture, M.P. 186° C.

*Analysis.*—Calcd. for $C_{16}H_{30}NO_2Cl$: Cl, 11.69%. Found: Cl, 11.51%.

The citrate salt was prepared from the free base, analogously to the preparation of the citrate of Example 1. Recrystallized from ethanol it melts at 182° C.

*Analysis.*—Citric acid, calcd.: 41.8. Citric acid, found: 41.5.

EXAMPLE 5

*Di-n-propyl acetyl tropinium methiodide*

The free base of Example 4 was prepared and treated with excess of methyl iodide in boiling acetone to yield di-n-propyl acetyl tropinium methiodide. Recrystallized from acetone it melts at 315°. It is sparingly soluble in water and the common organic solvents.

*Analysis.*—Calcd. for $C_{17}H_{32}NO_2I$: I, 31.0%. Found: I, 30.8%.

EXAMPLE 6

*Di-n-propyl acetyl tropinium methochloride*

The methiodide of Example 5 was boiled in methanol with a suspension of excess silver chloride, for six hours. The solid was filtered and the filtrate was evaporated to yield the above methochloride. It was recrystallized from acetone and melted at 289° C.

*Analysis.*—Calcd. for $C_{17}H_{32}NO_2Cl$: Cl, 11.1%. Found: Cl, 11.15%.

EXAMPLE 7

*Di-n-propyl acetyl tropinium methobromide*

The free base of Example 4 was treated with methyl bromide as in Example 2, to yield di-n-propyl acetyl tropinium methobromide. Recrystallized from boiling acetone it melts at 329° C.

*Analysis.*—Calcd. for $C_{17}H_{32}NO_2Br$: Br, 22.02%. Found: Br, 22.0%.

EXAMPLE 8

*Di-n-propyl acetyl tropinium ethobromide*

The free base of Example 4 was boiled in acetonitrile with excess of ethyl bromide to yield the title compound, M.P. 299° C.

*Analysis.*—Calcd. for $C_{18}H_{34}NO_2Br$: Br, 21.23%. Found: Br, 21.38%.

EXAMPLE 9

*Di-n-propyl acetyl tropinium buto bromide*

Following the procedure of Example 8 with substitution of n-butyl bromide for ethyl bromide, the title compound was obtained, M.P. 245° C.

*Analysis.*—Calcd. for $C_{20}H_{38}NO_2Br$: Br, 19.75%. Found: Br, 19.78%.

EXAMPLE 10

Di-n-propyl acetyl N-benzyl tropinium chloride

Following the procedure of example, with substitution of benzyl chloride for ethyl bromide, yielded the title compound, M.P. 250° C.

*Analysis.*—Calcd. for $C_{23}H_{36}NO_2Cl$: Cl, 9.25%. Found: Cl, 9.21%.

In similar fashions tropine esters and quarternary tropinium salts, of the general formula

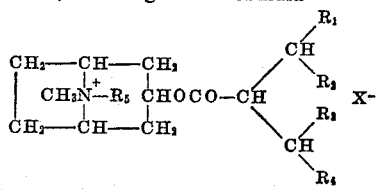

were made by varying the nature of $R_1$, $R_2$, $R_3$ and $R_4$ on the acid chloride to yield the tertiary amino alcohol esters. Similarly $R_5$ was varied by use of an appropriate alkyl or aralkyl halide in the reaction typified by Example 8. The compounds thus prepared are tabulated, including those already described in Examples 1–10 inclusive, in Table I.

TABLE I

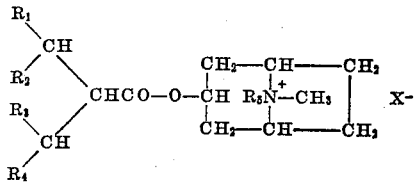

| Compound No. | $R_1$ | $R_2$ | $R_3$ | $R_4$ | $R_5$ | X | M.P., ° | Activity Atropine=100 |
|---|---|---|---|---|---|---|---|---|
| 1 | $CH_3$ | H | $CH_3$ | H | H | $C_6H_7O_7$ | 155 | 0.1. |
| 2 | $CH_3$ | H | $CH_3$ | H | $CH_3$ | Br | 318 | 0.5. |
| 3 | $CH_3$ | H | $CH_3$ | H | $n-C_4H_9$ | Br | 233 | 0.02. |
| 4 | $C_2H_5$ | H | $C_2H_5$ | H | H | Cl | 186 | 20. |
| 5 | $C_2H_5$ | H | $C_2H_5$ | H | $CH_3$ | I | 315 | not tested.[1] |
| 6 | $C_2H_5$ | H | $C_2H_5$ | H | $CH_3$ | Cl | 289 | 1,000. |
| 7 | $C_2H_5$ | H | $C_2H_5$ | H | $CH_3$ | Br | 329 | 1,000. |
| 8 | $C_2H_5$ | H | $C_2H_5$ | H | $C_2H_5$ | Br | 299 | 2. |
| 9 | $C_2H_5$ | H | $C_2H_5$ | H | $n-C_4H_9$ | Br | 245 | 2. |
| 10 | $C_2H_5$ | H | $C_2H_5$ | H | $C_6H_5CH_2$ | Cl | 250 | 0.25. |
| 11 | $C_2H_5$ | H | $CH_3$ | $CH_3$ | H | Cl | 193 | 1. |
| 12 | $C_2H_5$ | H | $CH_3$ | $CH_3$ | $CH_3$ | I | 330 | not tested.[1] |
| 13 | $C_2H_5$ | H | $CH_3$ | $CH_3$ | $CH_3$ | Cl | 299 | 13. |
| 14 | $C_2H_5$ | H | $CH_3$ | $CH_3$ | $n-C_4H_9$ | Br | 248 | 0.05. |
| 15 | $CH_3$ | $CH_3$ | $CH_2$ | $CH_3$ | H | $HSO_4$ | 257 | 0.1. |
| 16 | $CH_3$ | $CH_3$ | $CH_3$ | $CH_3$ | $CH_3$ | I | 336 | not tested.[1] |
| 17 | $CH_3$ | $CH_3$ | $CH_3$ | $CH_3$ | $CH_3$ | Cl | 322 | 0.2. |
| 18 | $CH_3$ | $CH_3$ | $CH_3$ | $CH_3$ | $n-C_4H_9$ | Br | 254 | 0.05. |
| 19 | $CH_3$ | H | $n-C_3H_7$ | H | H | $C_6H_7O_7$ | 177 | 2. |
| 20 | $CH_3$ | H | $n-C_3H_7$ | H | $CH_3$ | I | 321 | not tested.[1] |
| 21 | $CH_3$ | H | $n-C_3H_7$ | H | $CH_3$ | Cl | 297 | 10. |
| 22 | $CH_3$ | H | $n-C_3H_7$ | H | $n-C_4H_9$ | Br | 223 | 0.125. |
| 23 | $C_2H_5$ | H | $n-C_3H_7$ | H | H | $C_6H_7O_7$ | 185 | 5. |
| 24 | $C_2H_5$ | H | $n-C_3H_7$ | H | $CH_3$ | I | 321 | not tested.[1] |
| 25 | $C_2H_5$ | H | $n-C_3H_7$ | H | $CH_3$ | Cl | 292 | 200. |
| 26 | $C_2H_5$ | H | $n-C_3H_7$ | H | $n-C_4H_9$ | Br | 251 | 1. |
| 27 | $C_2H_5$ | H | $i-C_3H_7$ | H | H | $C_6H_7O_7$ | 182 | 5. |
| 28 | $C_2H_5$ | H | $i-C_3H_7$ | H | $CH_3$ | Br | 324 | 200. |
| 29 | $C_2H_5$ | H | $i-C_3H_7$ | H | $n-C_4H_9$ | Br | 253 | 0.5. |

[1] These compounds (all iodides) were not tested because they are of relatively sparing solubility in water.

As noted above, previously synthesized aliphatic or hydroxy aliphatic acid esters of tropine are generally devoid in atropine-like activity. All the compounds here disclosed have such activity in greater or lesser degree, but there is a notable number possessing activities between 10 and 1000 based on atropine being equal to 100. This is all the more remarkable since the pharmacologically most potent synthetic ester of tropine hitherto known has been homatropine methyl bromide of the following structure—

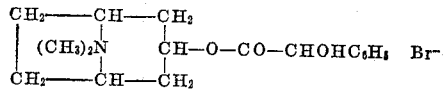

an ester of an hydroxy aromatic acid. The relative potency of this ester is 10 to 15 on the same basis of that of atropine. Thus the pharmacological properties of these new compounds are totally unexpected.

It may be pointed out that the minor structural change involved in passing from compound No. 1 to compound No. 4 or compound No. 19, has brought about a qualitative difference in the physical properties of the hydrochlorides of these bases. Whereas, the hydrochloride of No. 1 is preferentially extracted by dilute hydrochloric acid from chloroform, the hydrochlorides of No. 4 and No. 19, as well as the hydrochlorides of most of the other tertiary basic esters are preferentially extracted by chloroform from dilute hydrochloric acid. Accompanying the change in such physical property there is a two hundred to two thousand fold increase in atropine activity.

The operation of the invention herein disclosed is not tied to any theoretical basis for interpretation of the results. From the novelty herein disclosed it will now become apparent to one skilled in the art that it is possible to synthesize fatty acid esters of tropines, as well as of other amino alcohols, that can possess noteworthy and unexpectedly high pharmacological activities.

It will be understood that the foregoing description of the invention and the examples set forth are merely illustrative of the principles thereof. Accordingly, the appended claims are to be construed as defining the invention within the full spirit and scope thereof.

We claim:

1. Members of the group consisting of

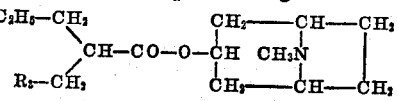

and

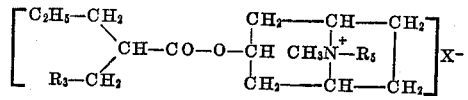

wherein $R_3$ is an alkyl radical having from 2 to 3 carbon atoms; $R_5$ is a member of the group consisting of hydrogen and methyl; and X is an anion of a pharmaceutically acceptable acid.

2. Di-(n-propyl)-acetyl-tropinium-hydrochloride.
3. (n-Propyl) (n-butyl)-acetyl-tropinium-acid citrate.
4. (n-Propyl) (isobutyl)-acetyl-tropinium-acid citrate.
5. Di-n-propyl-acetyl-tropinium-methochloride.

6. Di-n-propyl-acetyl-tropinium-methobromide.
7. (n-Propyl) (n-butyl) - acetyl-tropinium-methochloride.
8. (n-Propyl) (isobutyl) - acetyl - tropinium-methobromide.

References Cited in the file of this patent

UNITED STATES PATENTS 2,828,312    Johnston et al. _____ Mar. 25, 1958

OTHER REFERENCES

Gyermek et al.: Chem. Abstracts, vol. 47, col. 7111 (1953).
Nador et al.: Chem. Abstracts, vol. 48, col. 5353 (1954).
Gyermek et al.: Chem. Abstracts, vol. 48, col. 8938 (1954).
Rosenblum et al.: Chem. Abstracts, vol. 49, col. 6283 (1955).